United States Patent
Pomerantz et al.

(10) Patent No.: US 7,402,086 B2
(45) Date of Patent: Jul. 22, 2008

(54) USB CONNECTING SYSTEM AND METHOD

(75) Inventors: Itzhak Pomerantz, Kefar Saba (IL); Tavi Salomon, Holon (IL)

(73) Assignee: Sanbisk Il Ltd, Kfar-Saba (IL)

( * ) Notice: Subject to any disclaimer, the term of this patent is extended or adjusted under 35 U.S.C. 154(b) by 0 days.

(21) Appl. No.: 11/495,627

(22) Filed: Jul. 31, 2006

(65) Prior Publication Data

US 2007/0197065 A1  Aug. 23, 2007

Related U.S. Application Data

(60) Provisional application No. 60/774,157, filed on Feb. 17, 2006.

(51) Int. Cl.
*H01R 13/64* (2006.01)

(52) U.S. Cl. ...................................... 439/680

(58) Field of Classification Search .......... 439/677–681
See application file for complete search history.

(56) References Cited

U.S. PATENT DOCUMENTS

| | | | |
|---|---|---|---|
| 5,370,556 A * | 12/1994 | Olsson | 439/681 |
| 5,520,555 A | 5/1996 | Taylor | |
| 6,074,256 A | 6/2000 | Arnett | |
| 6,086,430 A * | 7/2000 | Amoni et al. | 439/680 |
| 6,854,984 B1 | 2/2005 | Lee et al. | |
| 7,056,149 B1 * | 6/2006 | Lanni | 439/488 |
| 7,121,899 B2 * | 10/2006 | Homann et al. | 439/680 |
| 7,182,523 B2 * | 2/2007 | Abendschein et al. | 385/56 |
| 2001/0009824 A1 * | 7/2001 | Kusagaya | 439/677 |
| 2004/0018772 A1 * | 1/2004 | Zhang et al. | 439/607 |
| 2005/0197018 A1 * | 9/2005 | Lord | 439/680 |

* cited by examiner

*Primary Examiner*—Ross N Gushi
(74) *Attorney, Agent, or Firm*—Mark M. Friedman

(57) ABSTRACT

A system including a plug device, configured to be reversibly operationally plugged into a socket of a standard configuration, and a socket device, configured with at least one restriction structure that prevents a plug that is configured according to the standard configuration from being operationally plugged into the socket device. The plug device is configured with a respective accommodating structure to be reversibly operationally plugged into the socket device despite the restriction structure. The scope of the invention also includes a method of digital rights management by configuring a media player with the socket device of the present invention to connect to a media carrier configured with the plug device of the present invention, thereby allowing only the media carrier configured with the plug of the present invention to download data to this media player.

16 Claims, 4 Drawing Sheets

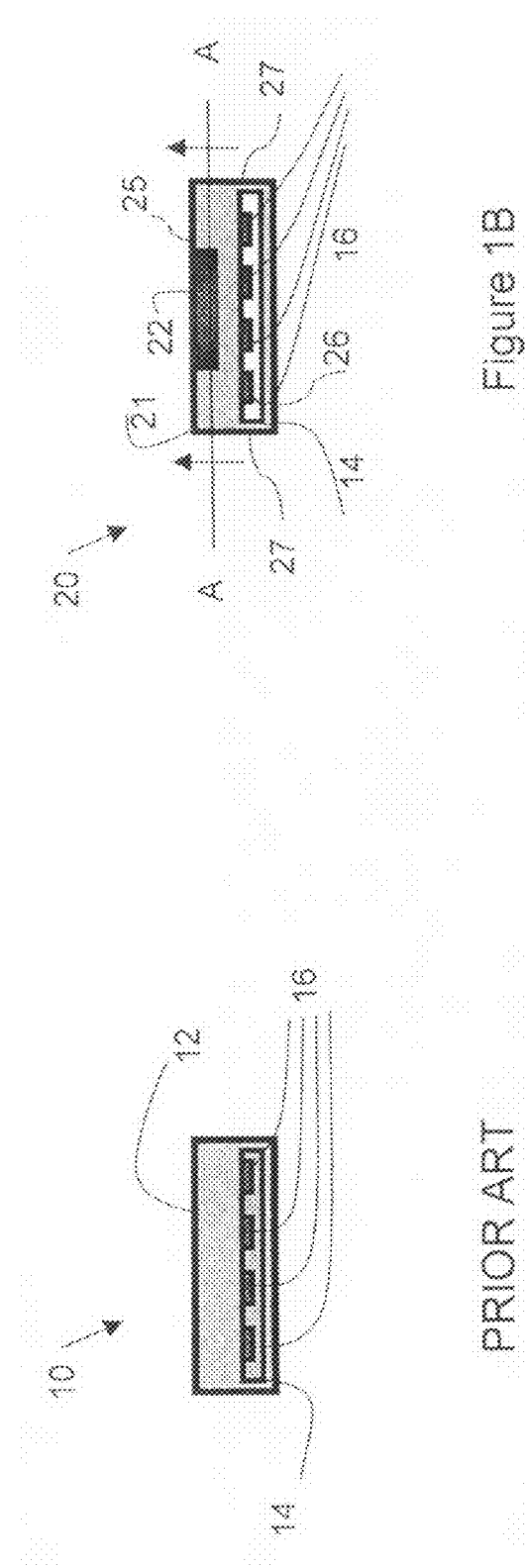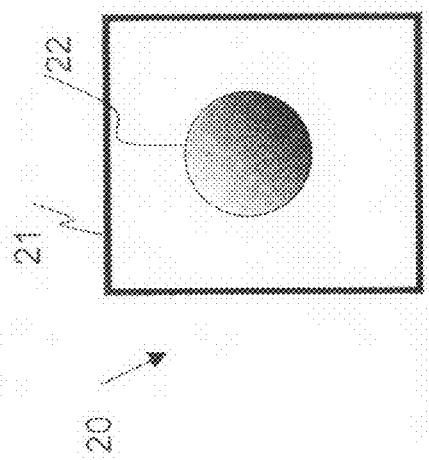
PRIOR ART
Figure 1A
Figure 1B
Figure 1C

USB CONNECTING SYSTEM AND METHOD

CROSS-REFERENCE TO RELATED APPLICATIONS

This patent application claims the benefit of U.S. Provisional Patent Application No. 60/774,157 filed Feb. 17, 2006.

FIELD OF THE INVENTION

The present invention relates to the field of USB connectors. More particularly, the present invention relates to a USB male connecting device that is operationally plugged into a USB female connecting device.

BACKGROUND OF THE INVENTION

USB (Universal Serial Bus) connectors and protocols are well known in the art of wired communication and are used as standard means for connecting devices to computers and other peripherals.

The broad acceptability of standard USB protocols and USB connectors obtains extreme connection flexibility between different devices. The A Type connector, such as USB A Type plug, available from ACON, Advanced-Connectek, Inc., is a flat form factor type of connector commonly used at the end of a cable of a device that plugs into the host/computer USB port or USB hub.

There are, however, business situations in which there is a need to limit the ability to connect USB peripherals to a device.

One example of such a business situation is a case of cooperation between a vendor of a portable media storage device and a vendor of a digital media playing device, wherein the cooperation implies that the storage device will be able to connect to a standard USB device for uploading content, and then to connect to only a specific media playing device for downloading the digital media.

SUMMARY OF THE INVENTION

Accordingly, it is a principal object of the present invention to solve a problem that is not addressed by the prior art techniques, by introducing a USB connecting device and method for selectively plugging only an authorized male connector into a respective female connector.

In accordance with the present invention, there is provided a system including: (a) a plug device that is configured to be reversibly operationally plugged into a socket, the socket configured according to a standard (such as the USB standard and the Firewire standard); and (b) a socket device that is configured with at least one restriction structure to prevent a plug that is configured according to the standard from being operationally plugged into the socket device, wherein the plug device is configured with a respective at least one accommodating structure to be reversibly operationally plugged into the socket device despite the restriction structure.

Preferably, the restriction structure of the socket device includes at least one protrusion.

Preferably, the socket device includes: (i) a socket housing; and (ii) a plurality of socket pins, such that the restriction structure of the socket device is configured on a surface of the socket housing that is opposite the plurality of socket pins. More preferably, the plug device includes: (iii) a plug housing; and (iv) a plurality of plug pins, wherein at least one the accommodating structure of the plug device is configured on a surface of the plug housing that is opposite the plurality of plug pins.

Alternatively, the socket device includes: (i) a socket housing; and (ii) a plurality of socket pins, such that the restriction structure of the socket device is configured on a surface of the socket housing that is adjacent the plurality of socket pins. More preferably, the plug device includes: (iii) a plug housing; and (iv) a plurality of plug pins, wherein at least one the accommodating structure of the plug device is configured on a surface of the plug housing that is adjacent to the plurality of plug pins.

Preferably, the restriction structure includes a structure that is configured on a side surface of a housing of the housing device.

Preferably, the restriction structure includes at least two structures that are configured on a housing of the socket device at least two locations, such as a surface of the housing that is opposite pins of the socket device, a surface of the housing that is adjacent the pins of the socket device, a side surface of the housing, etc.

Preferably, the restriction structure includes a material that is attached to the socket device.

Preferably, the restriction structure includes a dent extending inwards within a housing of the socket device.

Preferably, the system further includes two electric conductors embedded within the socket device, such that the plug device provides an electrically conductive path between the two electric conductors when the plug device is plugged into the socket device.

Preferably, the accommodating structure of the plug device includes at least one recess.

Preferably, the standard is a USB standard.

Preferably, the standard is a Firewire standard.

Preferably, the system further includes a media player for playing digital media that is configured with the socket device.

Preferably, the system further includes a media carrier (including a non-volatile memory for storing digital information) that is configured with the plug device.

In accordance with the present invention, there is also provided a system including: (a) a socket device configured to being reversibly operationally plugged into a plug that is configured according to a standard; and (b) a plug device configured with at least one restriction structure that prevents a socket that is configured according to this standard to be operationally plugged into the plug device; wherein the socket device is configured with a respective at least one accommodating structure for being reversibly operationally plugged into the plug device despite the restriction structure.

Preferably, the system further includes a media player for playing digital media that is operationally connected to the plug device.

Preferably, the system further includes a media carrier, including a non-volatile memory for storing digital information, which is operationally connected to the socket device.

In accordance with the present invention, there is also provided a method of digital rights management including the steps of: (a) configuring a media player with a socket device, having at least one restriction structure, to prevent a plug that is configured according to a standard from being operationally plugged into the socket device; (b) storing digital information in at least one media carrier; and (c) configuring the media carrier with a plug device to be reversibly operationally plugged into a socket that is configured according to this standard, wherein the plug device is configured with a respective at least one accommodating structure to be reversibly operationally plugged into the socket device despite the restriction structure, whereby allowing the media carrier, of which its plug device includes the accommodating structure, to download the digital information to the media player.

Preferably, only the media carrier, of which its plug device includes the accommodating structure, is allowed to download the digital information to the media player.

In accordance with the present invention, there is also provided a method of digital rights management including the steps of: (a) configuring a media player with a plug device, having at least one restriction structure, to prevent a socket that is configured according to a standard from being operationally plugged into the plug device; (b) storing digital information in at least one media carrier; and (c) configuring the media carrier with a socket device for being reversibly operationally plugged into a plug that is configured according to this standard, wherein the socket device is configured with a respective at least one accommodating structure for being reversibly operationally plugged into the plug device despite the restriction structure, whereby allowing said the media carrier, of which its socket device includes the accommodating structure, to download the digital information to the media player.

Preferably, only the media carrier, of which its socket device includes the accommodating structure, is allowed to download the digital information to the media player.

Additional features and advantages of the invention will become apparent from the following drawings and description.

BRIEF DESCRIPTION OF THE DRAWINGS

For a better understanding of the invention with regard to the embodiment thereof, reference is made to the accompanying drawings, in which like numerals designate corresponding sections or elements throughout, and in which:

FIG. 1A shows a front view of a prior art USB socket;

FIG. 1B shows a front view of a USB socket of the present invention;

FIG. 1C shows a cross-section of the USB socket of FIG. 1B;

DETAILED DESCRIPTION OF THE PREFERRED EMBODIMENTS

Figure 2B:
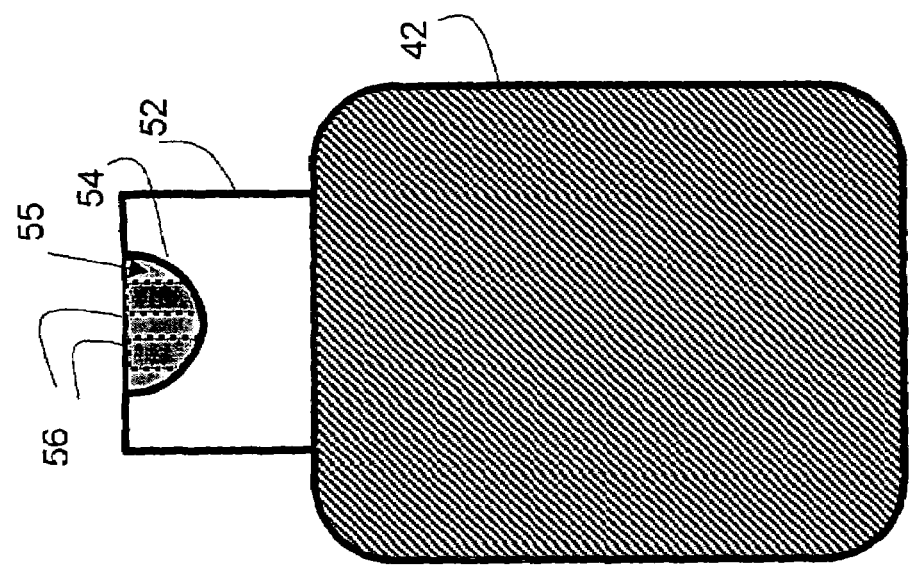
FIG. 2B shows a top view of a USB plug of the present invention.

The present invention is a system that includes a selective socket device and a selective plug device, which are configured to prevent plugging a standard plug (e.g. a standard USB male connector) into a socket of the present invention (e.g. a USB female connector of the present invention), while allowing a plug of the present invention to be plugged into either a standard socket or a socket of the present invention.

A standard socket is configured according to a standard (such as the USB standard and the Firewire standard) to allow enhanced connectivity and data transfer for video, audio and other storage peripheral applications.

The socket of the present invention is a selective socket that features a protrusion to prevent from plugging an unauthorized plug into the socket of the present invention. In other words, the socket of the present invention is configured to accommodate only the plug of the present invention.

The socket of the present invention is a modified socket device, including a restriction structure that is configured to prevent plugging a standard plug into the socket of the present invention. The plug of the present invention includes an accommodation structure (such as a recess) for accommodating the restriction structure of the socket, thus enabling to plug the plug of the present invention into the socket of the present invention as well as into any other standard socket.

Referring now to FIG. 1A, there is shown a front view of a prior art USB socket 10. Socket 10 includes a housing 12, typically made of metal, and a printed circuit board 14. Four conductor pins 16 are configured within the printed circuit board 14.

Referring to FIG. 1B, there is shown a front view of a USB socket 20 of the present invention. USB socket 20 is used here only as an example and it will be clear to those skilled in the art to apply the principles of the present invention to any kind of plug/socket combination.

Socket 20 includes a housing 21 having a printed circuit board 14 with four conductive pins 16 and a protrusion 22 that is designed to selectively prevent plugging an unauthorized plug (e.g. USB plug 40 of FIG. 2A) into socket 20. Hence, only plug 50 of FIG. 2B can be properly plugged into socket 20.

Most preferably, protrusion 22 is placed on the inward-facing surface at the broad side 25 of housing 21 that is remote from the printed circuit board 14 and conductor pins 16, opposite printed circuit board 14, as shown. Alternatively but less preferably, protrusion 22 is placed on the inward-facing surface at the broad side 26 of housing 21 that is closest to the printed circuit board 14 and conductor pins 16 or at a side inward-facing surface (i.e. the inward facing surface of wall 27 of housing 21). Alternatively, more than one protrusion 22 is placed in housing 21, for example on either broad side of housing 21.

Protrusion 22 as illustrated in FIG. 1B is an integral part of housing 21, protruding into the interior volume of housing 21. Alternatively, protrusion 22 is a dent in housing 21, extending inwards into the volume of housing 21 or is an additional piece of material attached to housing 21, substantially as thick as the walls of housing 21. The thickness of protrusion 22 is alternatively designed slightly thinner or slightly thicker than housing 21.

Referring to FIG. 1C, there is shown a view of socket 20 of FIG. 1B, along a cross section A-A of FIG. 1B. Protrusion 22 is positioned at the broad side 26 of housing 21 that is remote from the printed circuit board 14, opposite printed circuit board 14.

Figure 2A:
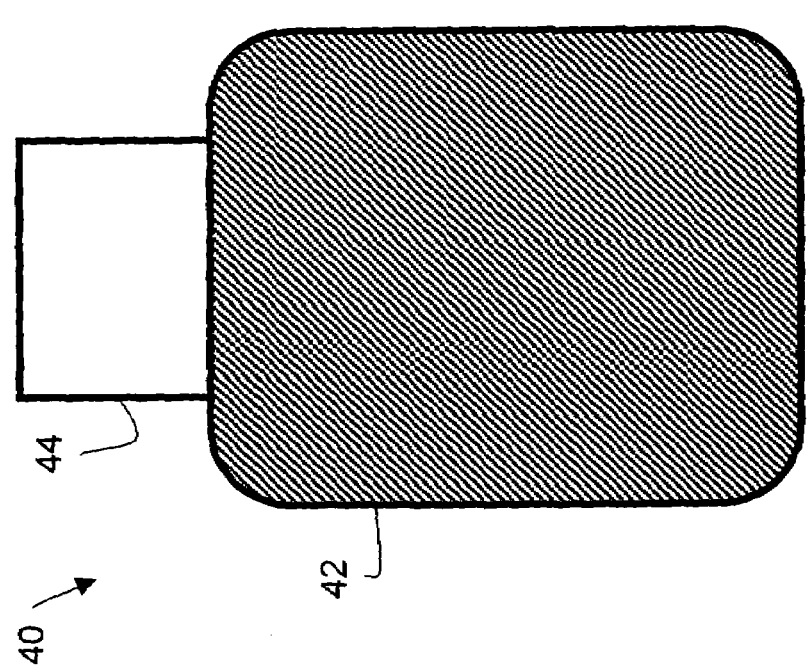
FIG. 2A shows a top view of a prior art USB plug.

Referring to FIG. 2A, there is shown a top view of a prior art USB plug 40 that is designed to be plugged into a standard USB socket, such as the prior art USB socket 10 of FIG. 1A. The body 42 of plug 40 is attached to a standard USB connector housing 44 known in the art.

Referring now to FIG. 2B, there is shown a top view of a selective plug 50 of the present invention. The body 42 is attached to a connector shell 52, typically made of metal. A recess 54 is included at the top-side (i.e. the flat side remote from the printed circuit board) of connector shell 52 to match protrusion 22 placed on the inward-facing surface at the broad side 25 of housing 21 that is remote from the printed circuit board 14 (of FIG. 1B). Recess 54 is shaped to fit protrusion 22 of FIG. 1B when USB plug 50 is plugged into socket 20 of FIG. 1B. By contrast, a standard male connector that is not equipped with such a recess can not be plugged into socket 20 of FIG. 1B.

Alternatively, recess 54 is located at the bottom-side (i.e. the flat side close to the printed circuit board) of connector shell 52 to match a protrusion similar to protrusion 22 but placed on the inward-facing surface at the broad side 26 of housing 21 that is closest to the printed circuit board 14 and conductor pins 16 (of FIG. 1B). Alternatively, more than one recess can be located at either or both side of connector shell 52.

Since recess 54 is designed to not affect the functionality of plug 50, plug 50 can be also plugged to any standard female connector (e.g. the USB socket 20 of FIG. 1A).

Conductor pins 56 implemented within connector shell 52 are marked with dotted lines to indicate that these pins, which are to contact conductors 16 of printed circuit board 14 (of FIG. 1B), are located on the hidden bottom part of printed circuit board 55 (of FIG. 2B).

Figure 3:
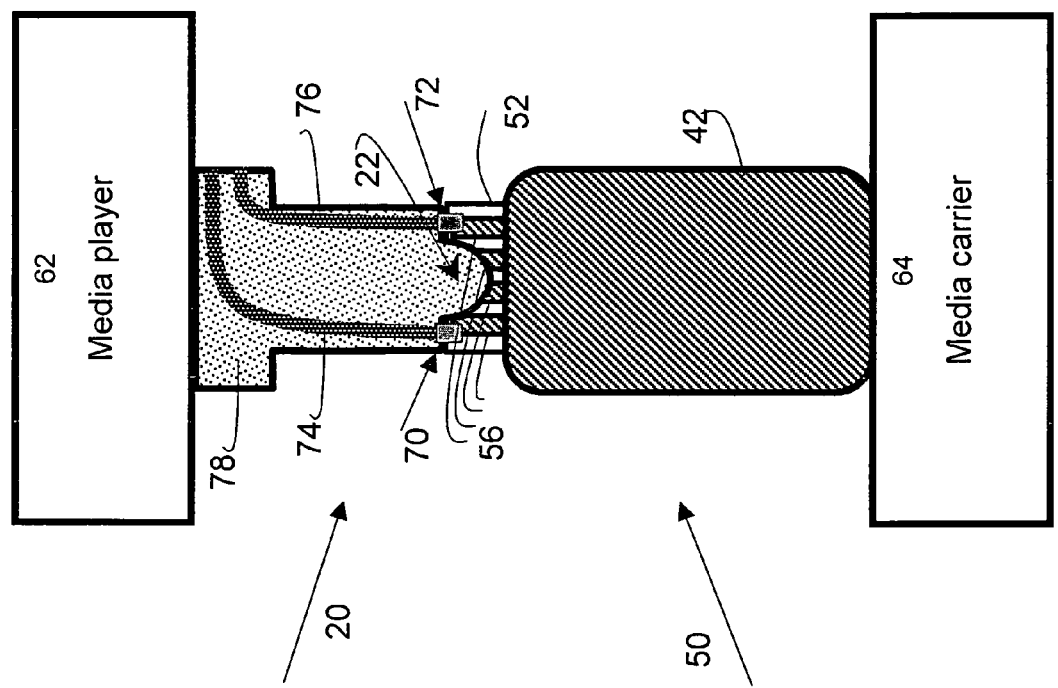
FIG. 3 shows the way in which the USB plug of FIG. 2B is plugged into the USB socket of FIG. 1B.

Referring to FIG. 3, there is shown the way in which plug 50 of FIG. 2B is plugged into socket 20 of FIG. 1B. Connector shell 52 is attached to the body 42 of plug 50. Conductor pins 56 implemented within connector shell 52 contact conductors 16 of printed circuit board 14 (see FIG. 1B).

Plug 50 (see FIG. 2B) includes recess 54 for accommodating protrusion 22 of socket 20 (see FIG. 1B). Two electric wires 74 and 76 are routed, insulated, through the volume 78 of socket housing 21. When plug 50 is plugged into socket 20, a part of the metallic connector shell 52 contacts two conductive pads 70 and 72 and provides electric wires 74 and 76 an electrically conductive path between the two conductive pads 70 and 72. Such provision of an electrically conductive path between two conductive pads 70 and 72, is conditional on connecting an authorized plug only (e.g. plug 50 of FIG. 2B) to the socket 20 of FIG. 1B.

Optionally, if the shell of socket 20 is grounded, then upon connecting plug 50 into socket 20 the two electric wires 74 and 76 are further grounded through connector shell 52 of plug 50.

This requirement of a conductive path between the two conductive pads 70 and 72 protects against any attempt to remove or cut shell of socket 20 that may be made by users who wish to bypass the security feature of the present invention.

Optionally, socket 20 as illustrated in FIG. 3 is part of a device, such as a media player 62 for playing data such as music stored on digital media, and plug 50 is part of a device such as a media carrier 64 for storing the digital data.

Figure 4B:
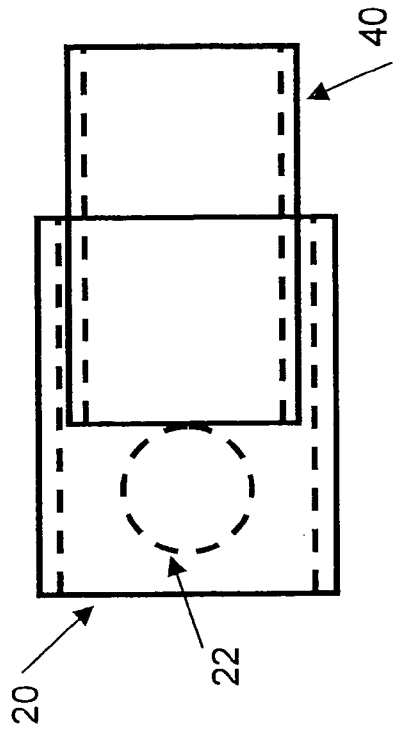
FIG. 4B shows a top view of the way in which the USB socket of the present invention is designed to selectively prevent plugging an unauthorized prior art plug into the USB socket.
Figure 4D:
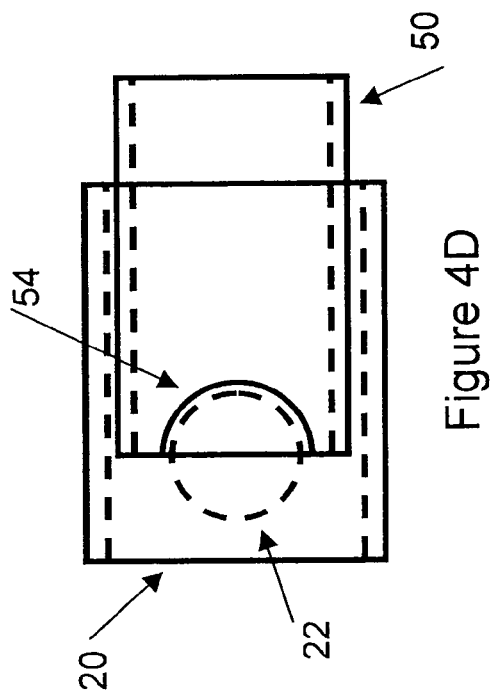
FIG. 4D shows a top view of the way in which the USB plug of the present invention is plugged into the USB socket of the present invention.
Figure 4A:
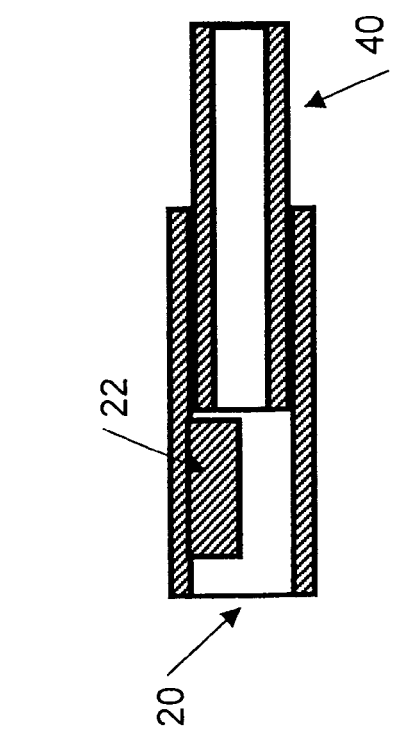
FIG. 4A shows, in side cross sectional view, the way in which the USB socket of the present invention is designed to selectively prevent plugging an unauthorized prior art plug into the USB socket.

Referring to FIG. 4A, there is shown, in side cross section, the way in which socket 20 is designed to selectively prevent from plugging an unauthorized prior art plug 40 into socket 20. Protrusion 22 is configured inside socket 20 so that no prior art plug 40, not even a prior art plug 40 configured according to the standard of socket 20, can properly be plugged into socket 20.

Referring to FIG. 4B, there is shown a schematic top view of the way in which the socket 20 is configured with protrusion 22 to prevent plugging the unauthorized prior art plug 40 into socket 20.

Figure 4C:
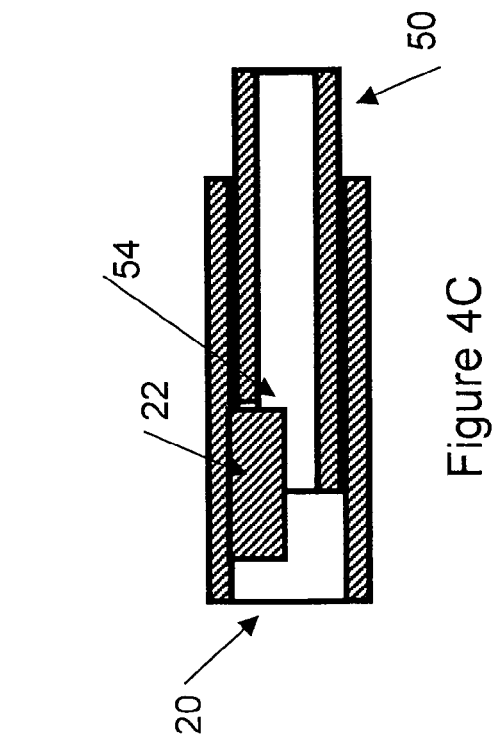
FIG. 4C shows, in side cross sectional view, the way in which the USB plug of the present invention is plugged into the USB socket of the present invention.

Referring to FIG. 4C, there is shown, in side cross section the way in which plug 50 of the present invention is plugged into socket 20 of the present invention. Plug 50 is equipped with recess 54 that accommodate protrusion 22 when plug 50 is plugged into socket 20.

Referring to FIG. 4D, there is shown a schematic top view of the way in which plug 50 of the present invention is plugged into USB socket 20.

The examples of plug and socket devices of the present invention presented above are male and female Type A USB connecting devices respectively. However, it can be understood that modification of plugs and sockets that conform to other standards and protocols are possible within the scope of the invention, thus relating to any male and female connectors.

The implementation of the selective socket device and the selective plug device of the present invention provides digital rights protection. While uploading of data can be made from the media player to any media carrier, only media carriers including the selective plug device of the present invention are configured to allow downloading digital information into such media player. This can be achieved by configuring a media player with the selective socket device and a media carrier with the selective plug device. Alternatively, this can be further achieved by connecting, by means of a cable, the media player to the selective socket device and by connecting the media carrier to the selective plug device.

It should be understood that the distinction between the terms "plug" and "socket" is done herein for clarity of description. The difference between a plug and a socket is only in their relative posture when mating—the plug is typically brought to penetrate into the socket. It should be clear that the system of the present invention remains valid also if the operational features of the plug and the socket are switched (i.e. the connecting device of the media player operates as a plug and the connecting device of the media carrier operates as a socket), as long as the media player is connected to a connecting device having a restriction structure and the media carrier is connected to a connecting device having a respective accommodating structure.

Having described the invention with regard to a certain specific embodiment thereof, it is to be understood that the description is not meant as a limitation, since further modifications will now suggest themselves to those skilled in the art, and it is intended to cover such modifications as fall within the scope of the appended claims.

The invention claimed is:

1. A system comprising:
   (a) a plug device configured to be operationally plugged into and unplugged from a socket that is configured according to a standard;
   (b) a socket device configured with a restriction structure that prevents a plug that is configured according to said standard from being operationally plugged into said socket device; and
   (c) two electric conductors embedded within said socket device;

wherein said plug device is configured with an accommodating structure to be operationally plugged into and unplugged from said socket device despite said restriction structure; wherein said restriction structure is recessed within said socket device; and, wherein said plug device provides an electrically conductive path between said two electric conductors when said plug device is plugged into said socket device.

2. The system of claim 1, wherein said restriction structure of said socket device includes a protrusion.

3. The system of claim 1, wherein said restriction structure of said socket device includes a material attached to said socket device.

4. The system of claim 1, wherein said restriction structure includes a dent extending inwards within a housing of said socket device.

5. The system of claim 1, wherein said accommodating structure of said plug device includes a recess.

6. The system of claim 1, wherein said standard is a USB standard.

7. The system of claim 1, wherein said standard is a Firewire standard.

8. The system of claim 1 further comprising:
(c) a media player, for playing digital media, operationally connected to said socket device.

9. The system of claim 1 further comprising:
(c) a media carrier, including a non-volatile memory for storing digital information, that is operationally connected to said plug device.

10. The system of claim 1, wherein a surface of said restriction structure that is closest to an open end of said socket device is separated from said open end of said socket device by more than about half of an interior length of said socket device.

11. The system of claim 1, wherein said socket device includes:
(i) a socket housing; and
(ii) a plurality of socket pins, such that said restriction structure of said socket device is configured on a surface of said socket housing that is opposite said plurality of socket pins.

12. The system of claim 11, wherein said plug device includes:
(i) a plug housing; and
(ii) a plurality of plug pins, wherein said accommodating structure of said plug device is configured on a surface of said plug housing that is opposite said plurality of plug pins.

13. A system comprising:
(a) a plug device configured to be operationally plugged into and unplugged from a socket that is configured according to a standard; and
(b) a socket device configured with a restriction structure that prevents a plug that is configured according to said standard from being operationally plugged into said socket device;
wherein said plug device is configured with an accommodating structure to be operationally plugged into and unplugged from said socket device despite said restriction structure; the system further comprising:
(c) two electric conductors embedded within said socket device, wherein said plug device provides an electrically conductive path between said two electric conductors when said plug device is plugged into said socket device.

14. A system comprising:
(a) a socket device configured to be operationally plugged onto and unplugged from a plug that is configured according to a standard; and
(b) a plug device configured with a restriction structure that prevents a socket that is configured according to said standard to be operationally plugged onto said plug device;
wherein said socket device is configured with an accommodating structure for being operationally plugged onto and unplugged from said plug device despite said restriction structure; the system further comprising:
(c) two electric conductors embedded within said plug device, wherein said socket device provides an electrically conductive path between said two electric conductors when said socket device is plugged onto said plug device.

15. A method of digital rights management comprising the steps of:
(a) configuring a media player with a socket device, having a restriction structure, to prevent a plug that is configured according to a standard from being operationally plugged into said socket device;
(b) storing digital information in at least one media carrier; and
(c) configuring said at least one media carrier with a plug device to be operationally plugged into and unplugged from a socket that is configured according to said standard;
wherein said plug device is configured with an accommodating structure to be operationally plugged into and unplugged from said socket device despite said restriction structure, thereby allowing said at least one media carrier, of which its plug device includes said accommodating structure, to download said digital information to said media player;
and wherein said socket device includes two electric conductors embedded therein, such that said plug device provides an electrically conductive path between said two electric conductors when said plug device is plugged into said socket device.

16. A method of digital rights management comprising the steps of:
(a) configuring a media player with a plug device, having a restriction structure, to prevent a socket that is configured according to a standard from being operationally plugged onto said plug device;
(b) storing digital information in at least one media carrier; and
(c) configuring said at least one media carrier with a socket device for being operationally plugged onto and unplugged from a plug that is configured according to said standard;
wherein said socket device is configured with an accommodating structure for being operationally plugged onto and unplugged from said plug device despite said restriction structure, thereby allowing said at least one media carrier, of which its socket device includes said accommodating structure, to download said digital information to said media player;
and wherein said plug device includes two electric conductors embedded therein, such that said socket device provides an electrically conductive path between said two electric conductors when said socket device is plugged onto said plug device.

* * * * *

UNITED STATES PATENT AND TRADEMARK OFFICE
CERTIFICATE OF CORRECTION

PATENT NO. : 7,402,086 B2
APPLICATION NO. : 11/495627
DATED : July 22, 2008
INVENTOR(S) : Itzhak Pomerantz and Tavi Salomon It is certified that error appears in the above-identified patent and that said Letters Patent is hereby corrected as shown below:

On the Title page item (73) Assignee correct "Sanbisk Il Ltd."
    to read --SanDisk IL Ltd.--

Signed and Sealed this

Sixteenth Day of September, 2008

JON W. DUDAS
*Director of the United States Patent and Trademark Office*